United States Patent
Sardar et al.

(10) Patent No.: US 8,274,973 B2
(45) Date of Patent: Sep. 25, 2012

(54) VIRTUAL SERVICE DOMAINS

(75) Inventors: Srinivas Sardar, Fremont, CA (US);
Udayakumar Srinivasan, Fremont, CA (US); Shankar Ramachandran, Mountain View, CA (US); Chidambareswaran Raman, San Jose, CA (US); Ajit Sanzgiri, Los Gatos, CA (US); Michael R. Smith, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 366 days.

(21) Appl. No.: 12/730,352

(22) Filed: Mar. 24, 2010

(65) Prior Publication Data

US 2011/0235645 A1    Sep. 29, 2011

(51) Int. Cl.
*H04L 12/50* (2006.01)

(52) U.S. Cl. ... 370/386; 370/389; 370/392; 370/395.32; 709/238

(58) Field of Classification Search ............... 709/217, 709/218, 219, 238, 239, 240, 241, 242, 243, 709/244; 370/389–400
See application file for complete search history.

(56) References Cited

U.S. PATENT DOCUMENTS

| | | | |
|---|---|---|---|
| 6,970,902 B1 | 11/2005 | Moon | |
| 7,111,073 B1 | 9/2006 | Jain et al. | |
| 7,415,512 B1 | 8/2008 | Moon | |
| 7,509,436 B1 | 3/2009 | Rissmeyer | |
| 7,609,649 B1 | 10/2009 | Bhandari et al. | |
| 7,685,223 B1 | 3/2010 | Basavaiah et al. | |
| 8,027,354 B1* | 9/2011 | Portolani et al. | 370/431 |
| 8,064,462 B2* | 11/2011 | Hussain et al. | 370/395.1 |
| 8,102,781 B2* | 1/2012 | Smith | 370/252 |
| 2003/0169747 A1* | 9/2003 | Wang | 370/400 |
| 2008/0177896 A1 | 7/2008 | Quinn | |
| 2008/0250266 A1 | 10/2008 | Desai | |
| 2010/0214949 A1* | 8/2010 | Smith et al. | 370/254 |
| 2011/0255538 A1* | 10/2011 | Srinivasan et al. | 370/392 |
| 2012/0017000 A1* | 1/2012 | Lim | 709/229 |

* cited by examiner

*Primary Examiner* — Phirin Sam
*Assistant Examiner* — Mounir Moutaouakil
(74) *Attorney, Agent, or Firm* — Cesari and McKenna, LLP (57) ABSTRACT

In one embodiment, layer-2 (L2) ports of a network device may each be assigned to a particular virtual service domain (VSD). One or more virtual service engines (VSEs) may also be assigned in a particular order to each VSD, where each VSE is configured to apply a particular service to traffic traversing the VSE between ingress and egress service ports. Interconnecting the L2 ports and the ingress and egress service ports is an illustrative virtual Ethernet module (VEM), which directs traffic it receives according to rules as follows: a) into a destination VSD via the one or more correspondingly assigned VSEs in the particular order; b) out of a current VSD via the one or more correspondingly assigned VSEs in a reverse order from the particular order; or c) within a current VSD without redirection through a VSE.

21 Claims, 11 Drawing Sheets

VIRTUAL SERVICE DOMAINS

TECHNICAL FIELD

The present disclosure relates generally to computer networks, and, more particularly, to service domains within computer networks.

BACKGROUND

A common trend in network computing relies on the use of a virtualized server environment in which multiple virtual machines operate within a single physical server. Often, network services are applied to network traffic, such as, for instance, services related to security, traffic optimization, traffic monitoring, etc. Such services, which are commonly offered in the form of specialized standalone appliances in computer networks, may be performed by virtualized servers using corresponding virtual machines within the server. These virtual machines, frequently offered by third-party developers for use in the virtualized server, typically expect to receive and process traffic over a pair of interfaces designated as either "server facing" or "network facing." For instance, a firewall virtual machine generally expects two configured ports, one for protected traffic (server facing) and one for unprotected traffic (network facing).

Currently, a complex system of virtual switches, e.g., for layer-2 physical and virtual ports, may be used within the virtualized servers to redirect traffic flow towards such virtual machines. Using many virtual switches or "vSwitches" in this manner within a network device may result in a system that is cumbersome to configure and debug, and that requires increased internal resources such as memory (e.g., for multiple forwarding tables for each vSwitch, etc.).

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to embodiments of the disclosure, layer-2 (L2) ports of a network device may each be assigned to a particular virtual service domain (VSD). One or more virtual service engines (VSEs) may also be assigned in a particular order to each VSD, where each VSE is configured to apply a particular service to traffic traversing the VSE between an ingress service port that does not face a corresponding VSD to which the VSE is assigned and an egress service port that does face the corresponding VSD. Interconnecting the L2 ports and the ingress and egress service ports is an illustrative virtual Ethernet module (VEM), which directs traffic it receives according to rules as follows: a) into a destination VSD via the one or more correspondingly assigned VSEs in the particular order; b) out of a current VSD via the one or more correspondingly assigned VSEs in a reverse order from the particular order; or c) within a current VSD without redirection through a VSE.

DESCRIPTION

A computer network typically comprises a plurality of interconnected entities. An entity may consist of any network device, such as a server or end station, that "sources" (i.e., transmits) or "sinks" (i.e., receives) data frames. A common type of computer network is a local area network ("LAN"), which typically refers to a privately owned network within a single building or campus. LANs typically employ a data communication protocol (LAN standard), such as Ethernet, FDDI or token ring, that defines the functions performed by the data link and physical layers of a communications architecture (i.e., a protocol stack).

One or more intermediate network devices are often used to couple LANs together and allow the corresponding entities to exchange information. For example, a switch (or bridge) may be used to provide a "switching" (or "bridging") function between two or more LANs. Typically, the switch is a computer and includes a plurality of ports that are coupled to the LANs. Ports that are coupled to LANs that are, in turn, coupled to other switches are generally referred to as a trunk ports, whereas ports used to couple switches through LANs to end stations are generally referred to as access ports. The switching function includes receiving data from a sending entity at a source port and transferring that data to at least one destination port for forwarding to a receiving entity.

Although bridges/switches may operate at various levels of the communication protocol stack, they typically operate at Layer-2, which, in the OSI Reference Model, is called the data link layer and includes the Logical Link Control (LLC) and Media Access Control (MAC) sub-layers. Data frames at the data link layer typically include a header containing the MAC address of the entity sourcing the message, referred to as the source address, and the MAC address of the entity to which the message is being sent, referred to as the destination address. To perform the switching function, Layer-2 switches examine the MAC destination address of each data frame received on a source port. The frame is then switched onto the destination port(s) associated with that MAC destination address.

Other devices, commonly referred to as routers, may operate at higher communication layers, such as Layer-3 of the OSI Reference Model, which in Transmission Control Protocol/Internet Protocol (TCP/IP) networks corresponds to the Internet Protocol (IP) layer. Packets at the IP layer also include a header, which contains an IP source address and an IP destination address. Routers or Layer-3 switches may re-assemble or convert received data frames from one LAN standard (e.g., Ethernet) to another (e.g. token ring). Thus, Layer-3 devices are often used to interconnect dissimilar subnetworks.

Figure 1:
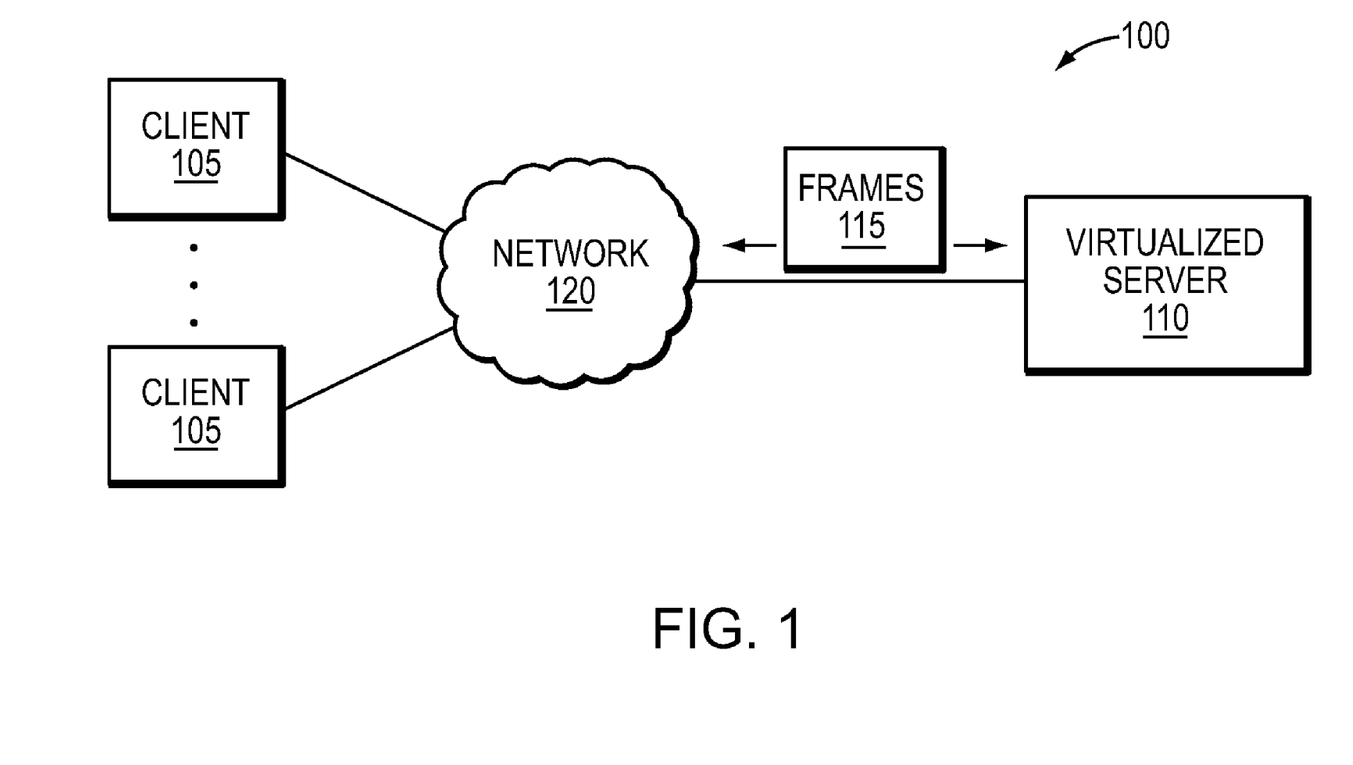
FIG. 1 illustrates an example computer network.

FIG. 1 is a schematic block diagram of an example simplified computer network 100 illustratively comprising network nodes/devices, such as client devices 105 interconnected to at least one server 110 (e.g., a virtualized server, as described below) through a network of links/nodes 120. The client devices may be any type of computing device that connects to the network, such as computers/PCs, servers, printers, IP-phones, etc., or even audio/video bridging equipment, such as televisions, stereo equipment, and so on. Notably, any number of nodes, devices, links, etc. may be used in the computer network, and the view shown herein is for simplicity. The computer network 100 of FIG. 1 is meant for illustration purposes only and is not meant to limit the embodiments described herein.

Figure 2:
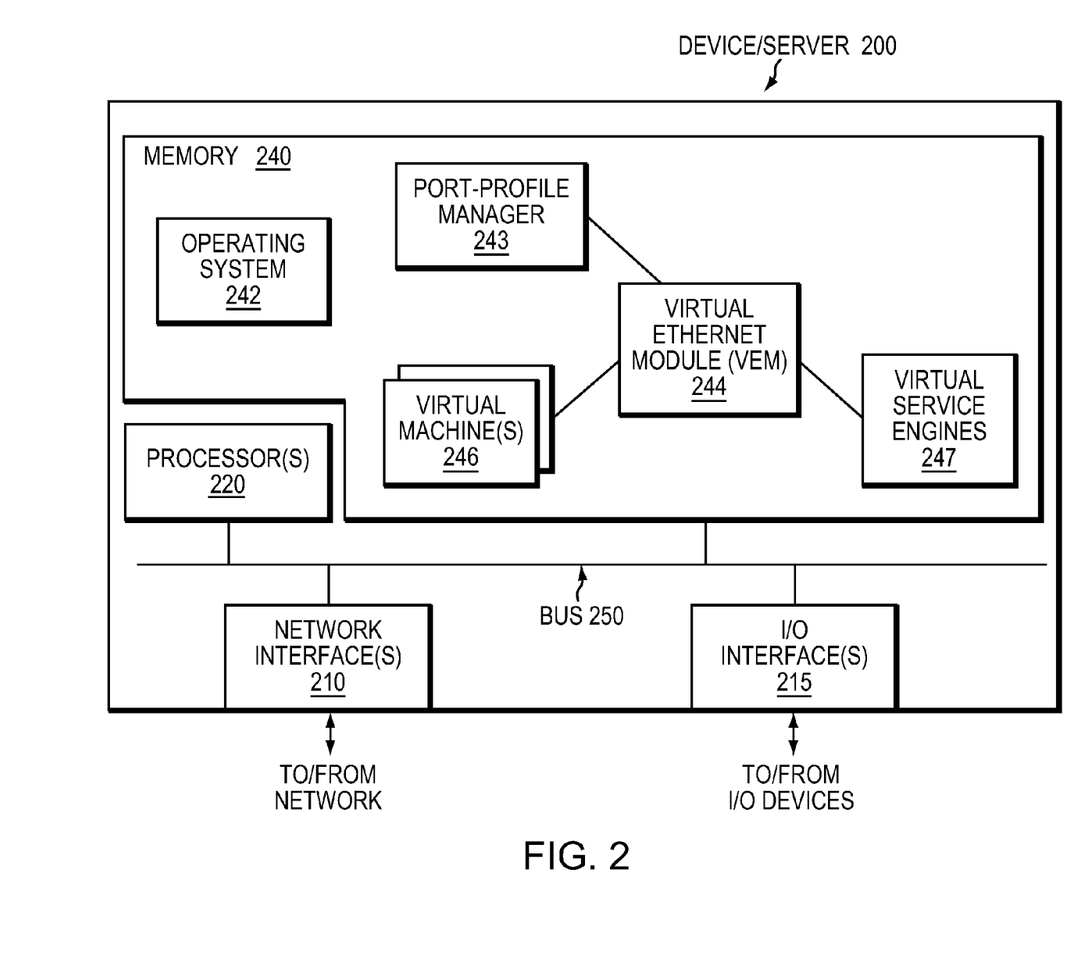
FIG. 2 illustrates an example network device/node.

FIG. 2 is a schematic block diagram of an example network node/device 200 that may be advantageously used with one or more embodiments described herein, e.g., as a virtualized server (110). The device comprises one or more network interfaces or ports 210, one or more input/output (I/O) interfaces 215, one or more processors 220, and a memory 240 interconnected by a system bus 250.

The network interfaces/ports 210 contain the mechanical, electrical, and signaling circuitry for communicating data over physical links coupled to the network 100. The network interfaces/ports may be configured to transmit and/or receive data (frames 115 in FIG. 1) using a variety of different communication protocols over physical links or wireless links. For example, such communication protocols may include, inter alia, TCP/IP, UDP, ATM, synchronous optical networks (SONET), wireless protocols (e.g., IEEE Std. 802.11 or 802.16), Frame Relay, Ethernet (e.g., IEEE Std. 802.3), Fiber Distributed Data Interface (FDDI), etc. Notably, a network interface/port 210 may also be used to implement one or more virtual network interfaces, such as for Virtual Private Network (VPN) access or Virtual LANs (VLANs), as will be understood by those skilled in the art. Illustratively, the handling of frames within the network interfaces/ports 210 may conform to a protocol stack that defines the functions performed by the data link and physical layers of a communications architecture.

I/O interfaces 215 contain the mechanical, electrical, and signaling circuitry for communicating data between one or more I/O devices, such as keyboards, monitors, mice, speakers, etc. I/O interfaces may receive input from an external source, such as a user (thus, a "user interface"), and may communicate an output to the external source (display, sounds, etc.).

The memory 240 comprises a plurality of storage locations that are addressable by the processor(s) 220 and the network interfaces/ports 210 for storing software programs and data structures associated with the embodiments described herein. The processors 220 may comprise necessary elements or logic adapted to execute the software programs and processes and manipulate the data structures. An operating system 242 (e.g., the Internetworking Operating System, or IOS™, of Cisco Systems, Inc.), portions of which are typically resident in memory 240 and executed by the processor(s), functionally organizes the node by, inter alia, invoking network operations in support of software processes and/or services executing on the device. It will be apparent to those skilled in the art that other types of processors and memory, including various computer-readable media, may be used to store and execute program instructions pertaining to the inventive technique described herein.

Portions of the device 200 may be organized as particular components or modules that are configured to perform various processes and/or services for the device. For instance, these components or modules may be hardware, software, firmware, logic (e.g., on an application-specific integrated circuit or "ASIC"), etc., depending upon implementation and functionality, as may be appreciated by those skilled in the art.

For example, certain processes and/or services as used herein may comprise, as described herein, a port-profile manager (PPM) 243, a novel "virtual Ethernet module" (VEM) 244, one or more virtual machines (VMs) 246, and one or more virtual service engines (VSEs) or service virtual machines (SVMs) 247 (each shown stored/executed within memory 240 as one example implementation). Other processes and/or services may also operate on the device 200, such as bridging/switching functions as may be appreciated by those skilled in the art, but for simplicity these processes and/or services have not been shown. The inclusion or exclusion of certain processes/services is merely illustrative.

As noted above, virtualized servers may support one or more virtual machines 246 to provide a variety of network functions, such as server functions (e.g., web servers, email servers, database servers, storage servers, audio/visual or "A/V" services, etc.) and/or various traffic services (e.g., security, firewalling, optimization, monitoring, etc.), more specifically VSEs/SVMs 247. While such services have been commonly implemented as standalone appliances in computer networks (servers, firewalls, etc.), the virtualized servers 200 may thus be configured to apply such services from within a single device through corresponding virtualized network appliances within the server.

As also noted, a complex system of virtual switches may be used within the virtualized servers to redirect traffic flow towards such virtual appliances. However, using virtual switches or "vSwitches" in this manner within a network device may result in a system that is cumbersome to configure and debug, and that requires increased internal resources such as memory (e.g., for multiple forwarding tables for each vSwitch, etc.). Various techniques have been used within layer-3 (L3) technology for traffic redirection for applying "features" or "services", while at layer-2 (L2) previously existing techniques utilize access control lists (ACLs) or VLAN stitching, neither of which being particularly scalable or simple to implement.

According to embodiments of the disclosure, therefore, layer 2 ports (which may be virtual or physical) of the device 200 may be grouped into virtual service domains (VSDs). For example, the grouping/assignment may be made manually by an administrator or based on some dynamically determined/discovered attribute of the port. The semantics of this assignment is that when entering or leaving a port in a VSD, any network packet not destined to another port in the same VSD is directed by the VEM 244 through ports connecting to the service engine VMs (VSEs 247) assigned to that VSD in a particular specified order. VSEs 247 may connect to the device (e.g., from within the device as a virtual service engine or as a separate device located outside of the device 200) via pairs of ports, namely, one that has been serviced and one that has not (that is, generally the pair of ports straddles the domain—the domain-facing port being inside the domain and the other one being outside it). For example, for a VSE 247 acting as a firewall, the pair of ports may be seen as bridging between a protected (domain-facing) and an unprotected (network-facing) interface.

The novel VEM 244 provides switching between ports of directly attached virtual machines 246/247 and up-linking to the rest of the physical network outside of the virtualized server 200. (A single virtual supervisor module may be used for configuration, management, monitoring, diagnostics, etc. for multiple VEMs.) Through interaction with the port profile manager 243, physical and/or virtual L2 ports of the device 200 may each be assigned to a particular VSD (VSDs are generally non-overlapping), such as by setting port index, for example, a local target logic (LTL) or "coloring" of the ports (color blocking logic or "CBL"). For example, the assignments may be implemented in response to receiving manual assignments from a user interface or by dynamically assigning ports based on port attributes. Note that L2 ports of the device that are not assigned to a VSD are considered to be within a default VSD without an assigned VSE (e.g., external physical ports).

Specifically, VSDs (or virtual zones or "vZones") are logical entities that may be created based on user (customer or provider) preferences in order to correlate ports, particularly virtual machine ports, together for a common service. Said differently, a VSD (vZone) can be defined as a collection of interfaces that are serviced by the same set of service VMs (VSEs) service where any traffic entering or leaving the VSD generally goes through the servicing VSE(s). For example, ports that benefit from the protection of a virtual firewall may be assigned to a VSD that is protected by the particular firewall VSE.

Figure 3:
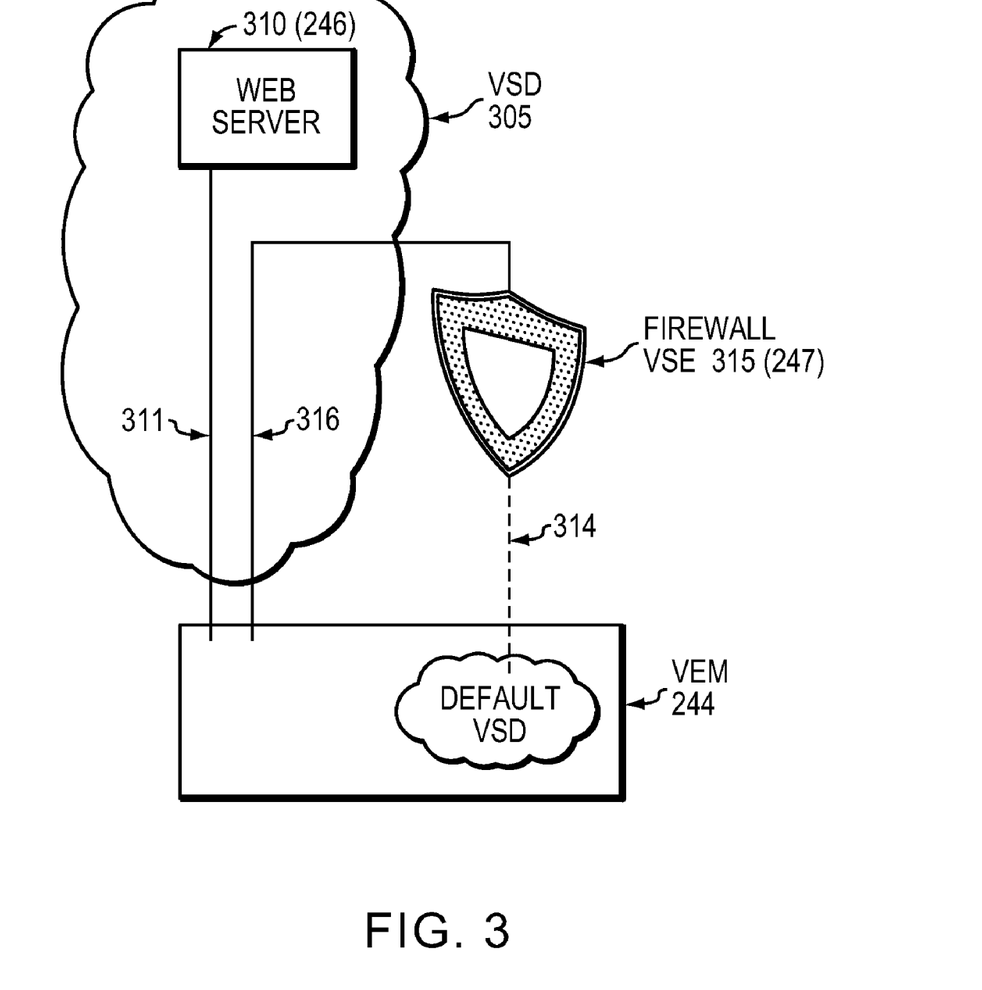
FIG. 3 illustrates an example and simplified virtual view of the network device.

FIG. 3 illustrates a simplified example of a VSD 305 having a web server virtual machine 310 that is protected by a firewall VSE 315. The VEM 244 may be configured to supply traffic to the web server 310 by first sending traffic to the unprotected firewall interface 314, through the firewall 315, and then forwarding traffic received on the protected firewall interface 316 to the web server's interface 311. When receiving traffic from the web server 310, the VEM 244 may transmit the traffic via the firewall in the reverse order (onto protected interface 316 to be received back on unprotected interface 314). In other words, VSDs/zones are defined such that traffic coming into or going out of a VSD is processed by a VSE 247. Notably, the VSE 247 may or may not process the traffic leaving a VSD, and as such, the VEM 244 may or may not be configured to transmit traffic on an identical path into and out of a VSD. For instance, it may be configured that traffic leaving a VSD need not be monitored while traffic entering should be. As such, a traffic monitoring VSE need only be traversed when entering the corresponding VSD.

Note that the interfaces of the VSEs have specific properties, as described below.

Figure 4:
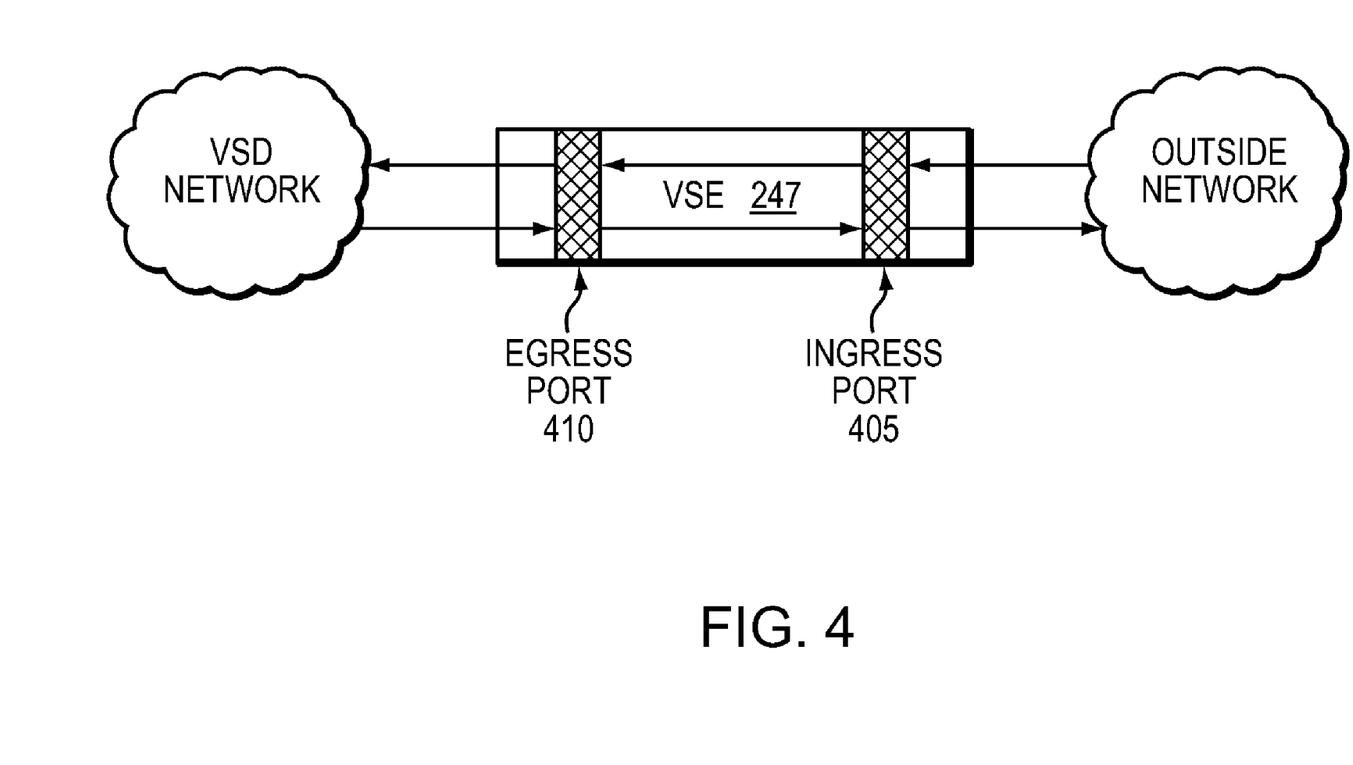
FIG. 4 illustrates an example virtual view of ports of a virtual service engine.

Ingress interface (delineated in FIG. 3 as a dashed line): Services the traffic coming into the VSD—any packet coming into the VSD has to enter the ingress interface and go through the VSE to the egress interface (if allowed based on the service);

Egress interface (delineated in FIG. 3 as a solid line): Services the traffic going out of the VSD—any packet sourced from interfaces within a VSD going out of the VSD generally has to go via the egress interface through the VSE and out to the ingress interface (if allowed);

FIG. 4 illustrates a more detailed example service port arrangement of a typical VSE 247. For instance, as noted, a VSE (SVM) generally has two service ports, one ingress or ingoing service port 405 and one egress or outgoing service port 410. The egress port 410 is assigned to a particular VSD for which the VSE/SVM services, and thus the egress port may be considered to be within the corresponding VSD to which the particular VSE 247 is assigned. The ingress port 405 may be assigned to another VSD, or simply the default VSD (such as where no assignment is made). Again, any traffic that is destined to a VSD from outside VSD enters the VSE through the ingress service port and leaves the egress service port, while any traffic that is sourced in VSD but destined out of the VSD generally enters the VSE through the egress service port and leaves the ingress service port. Note that any intra-VSD traffic need not be routed through the VSE as they are already serviced by the VSE (e.g., are considered to be safe where the VSE is an example firewall). A separate management interface may also be used to manage the VSE, located either inside or outside of the VSD as desired. While the arrangement in FIG. 4 illustrates a direct connection to a VSD and an outside network (i.e., not the assigned VSD), each of the ingress and egress ports are logically interconnected with the VEM 244 as described elsewhere herein.

Furthermore, according to one or more embodiments herein, there is no source media access control (MAC) address learning on the ingress service ports or egress service ports. Without preventing/disabling MAC learning, the ports may act as destination interfaces for virtual machines in multiple VSDs, thus causing packets to end up in VSE ports as final destinations. As such, static MAC addresses may be assigned to VSE ports instead. Also, the service ports may be configured as trunk ports, and should be capable of receiving all traffic on all VLANs.

Figure 5A:
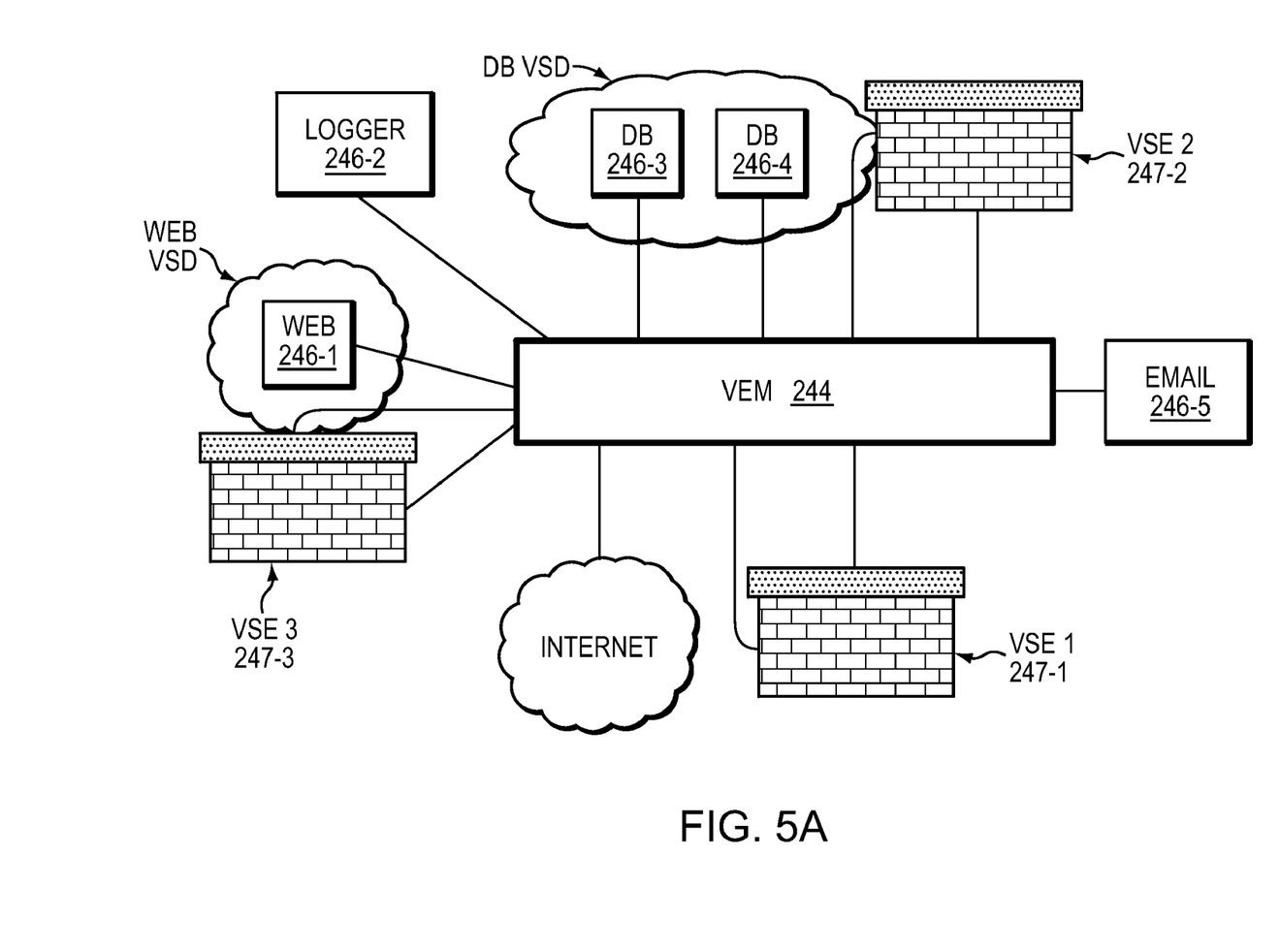
FIG. 5A illustrates an example virtual view of the network device.

FIG. 5A illustrates an expanded example arrangement of VSDs within the management of a representative VEM 244. For instance, in this example embodiment, VEM 244 is interconnected with virtual machines 246 comprising a web server ("WEB") 246-1, a logger ("LOGGER") 246-2, two database storage locations ("DB") 246-3 and 246-4, and an email server ("EMAIL") 246-5. In addition, VEM 244 is interconnected with VSEs 1-3 (247-1, 2, and 3, respectively), such as firewalls, and the internet (e.g., via a physical interface 210, e.g., a physical network interface card or "pNic"). Note that while each VSE 247 is shown as a separate entity, it is also possible that two or more port pairs (ingress/egress for a particular VSD's VSE) may connect to the same VSE, which could be providing its services to multiple VSDs. In other words, a VSE may be shared among different VSDs, either through traffic differentiation within the packets or by adding more virtual port pairs to the same VSE (thus differentiating based upon which virtual port the traffic is received).

The VEM 244 is arranged to store the port/VSD assignments and VSE/VSD assignments in order to properly direct traffic within the virtualized network within virtualized server 200. For example, the ports of the two database servers (DBs) may be configured to be within a DB VSD that is the result of being serviced by VSE 2. Also, the web server (WEB) may be located behind VSE 3 in a WEB VSD, while the internet, e.g., an external interface, may be located in an internet VSD such that traffic received at the device from any external source is first serviced by VSE 1. These assignments may either be manually entered by a user (customer or provider), or may be determined dynamically (e.g., adding new DBs may simply result in inclusion of their ports in the DB VSD).

The VEM 244 (e.g., in conjunction with memory 240) may store the assignments within one or more data structures, such as an illustrative VSD table (or "interface binding table"). This table is a data structure that the VEM manages, and may be used to bind ports/interfaces to a particular VSD. Indexed by a unique VSD ID or user-defined VSD Name, the table contains VSE ingress and egress port information for a specific VSD, and the list of associated L2 ports assigned to (within the) VSD. In addition, the table may define an ingress and egress service port index, such as, e.g., the ports' local target logic (LTL) label, which may be used as a destination LTL for the packets (going into the VSD or coming out of the VSD, respectively)) that were redirected to the corresponding VSE.

Further, in one or more embodiments, the table (or other suitable data structure) may contain a VSD "default action" attribute, which may be used (e.g., by a forwarding engine) to determine whether the packets should be forwarded to the final destination or dropped if the service port is down/unreachable. For instance, some service engines may be security critical applications such as firewalls while others may be non-critical applications such as monitoring processes. Depending on the nature of application that is executed by the VSE/SVM, this attribute may be configured accordingly. Illustratively, if this attribute is configured to "forward," then the packets are forwarded to the next location, which may either be the final destination or a next VSE prior to reaching the VSD, as described below. Alternatively, if this attribute is configured to "drop" if the VSE port is down, then all packets that have to be serviced by this VSE are dropped. Also, a port profile/entry data structure may be managed and maintained by the VEM 244 that identifies, for each port, the associated VSD ID for the port, and a port type (e.g., service—ingress/egress, or not).

Assignments within the table, and thus the appropriate traffic forwarding action, may be added, removed, or modified. For instance, manual input received may change the data structure's values (e.g., the assignments and/or actions), or, based on port state changes or other non-user-caused changes to virtual machines or VSEs, the values may is adjust dynamically. A forwarding engine may then manage its forwarding decisions (e.g., within its own VSD forwarding table) to redirect unicast, broadcast, and multicast packets. Note that packets can be redirected based on certain packet match criteria, such as type/class/etc., and not merely based on the final destination.

As described above, traffic received at the VEM 244 may be directed according to the following simplified rules:

a) for traffic traversing into a destination VSD, directing the traffic via the one or more correspondingly assigned VSEs in the particular order;

b) for traffic traversing out of a current VSD, directing the traffic via the one or more correspondingly assigned VSEs in a reverse order from the particular order; and c) for traffic remaining within a current VSD, directing the traffic without redirection through a VSE.

Figure 5B:
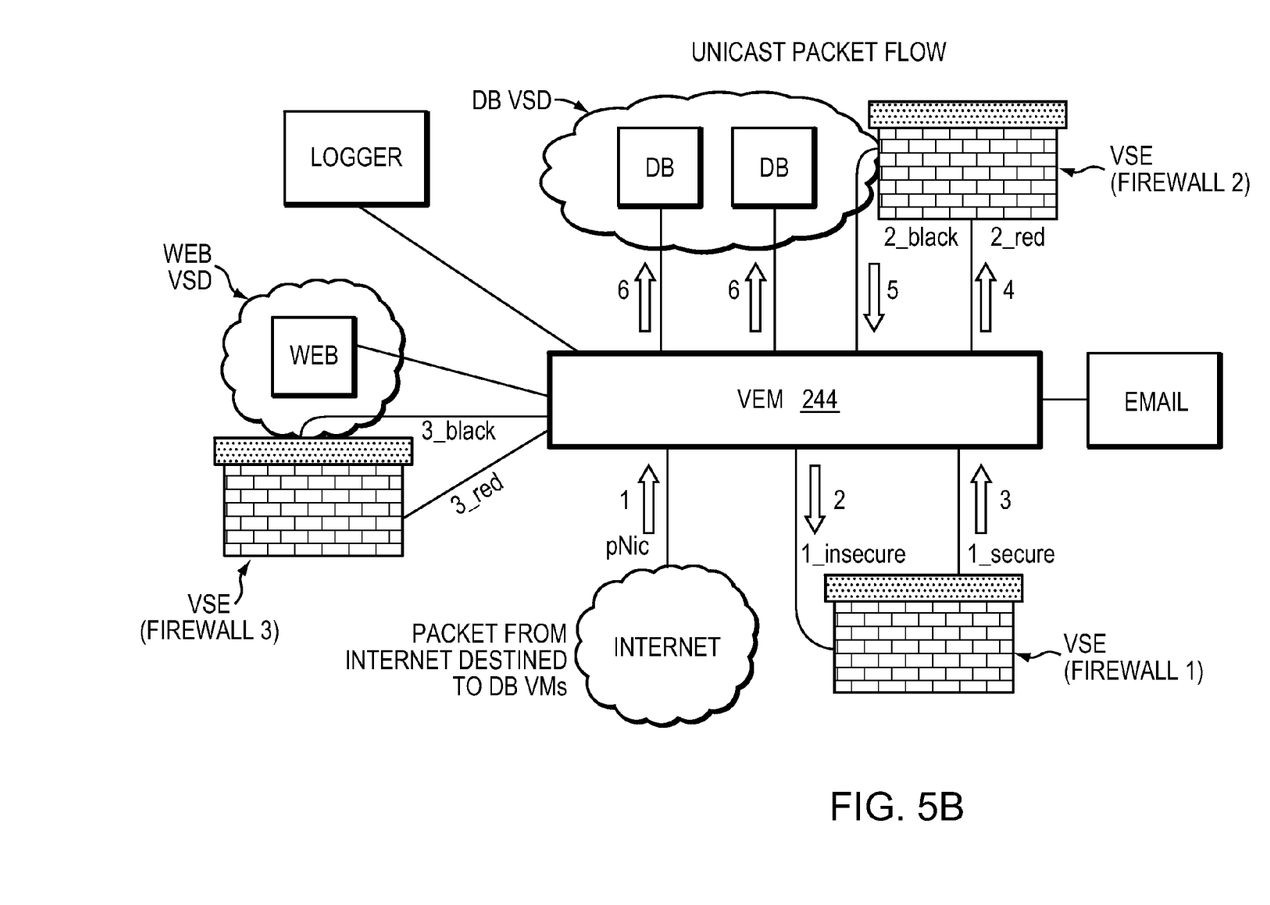
FIGS. 5B-E illustrate example virtual views of the network device and forwarded traffic.

FIG. 5B illustrates the arrangement of FIG. 5A as it may be used to direct a sample Unicast packet flow from the internet to the DB virtual machines 246. Assume, for example, that any traffic coming from the internet is protected by the VSE Firewall 1, and that any traffic flowing into the DB VSD will be protected by VSE Firewall 2. As such, all unicast packets going from the internet to a DB will be processed by both Firewall 1 and Firewall 2. The following illustrative sequence may thus occur:

STEP 1: A packet enters from the internet (e.g., through pNic), and the source MAC is learned (if needed). A Source port index may then be obtained from the Source MAC address of the packet, while a Destination port index may be obtained from the Destination MAC address. These may be used to index into the port entry data structure to retrieve an appropriate source port entry and destination port entry, respectively. The source port entry (the internet-attached port) may be associated with the internet VSD, so all packets received on this port are serviced/filtered by VSE Firewall-1. By retrieving the VSE firewall-1's input port index from the VSD Table (in this case Firewall-1's is input port is a port which has a "1_insecure" port profile configured), the VEM may set the destination port index as the input port index of the VSE Firewall-1.

STEP 2: At the egress stage, based on the Destination port index, the packet is forwarded to the VSE Firewall-1.

STEP 3: The packet is received from the egress service port of the VSE Firewall-1 (i.e., the source port index=Egress Service Port index), and no MAC learning is performed. The destination port index may be used as an index into the port entries to retrieve the destination port entry, which is associated with the DB VSD. The DB VSD is protected by VSE Firewall-2, so the VEM retrieves the corresponding DB VSD's input port index from the VSD Table (in this case the DB VSD's input port is a port which has a "2_red" port profile configured) to set the destination port index as the input port index for VSE Firewall-2.

STEP 4: At this egress stage, based on the current destination port index, the packet will be forwarded to VSE Firewall-2.

STEP 5: The packet is received from the egress service port of VSE Firewall-2, (i.e., the source port index=Egress Service Port index), and again, MAC learning is not performed on this port. The destination port index is used as index into the port entry data structure to retrieve the destination port entry, which is associated with the DB VSD. The DB VSD is protected by the VSE Firewall-2, but the packet has already been processed by the VSE Firewall-2 (based on the source port index just received). Accordingly, a lookup based on the destination MAC address results in the final destination DB virtual machine's VM port index, which is used to set the destination port index of the packet.

STEP 6: Finally, at this egress stage, based on the destination port index, the packet is forwarded to the final destination DB virtual machine.

Notably, the reverse path may be correspondingly utilized for a unicast packet flow from one of the destination DB virtual machines back to the internet. For instance, the path would then be:

A—from the DB to the VEM;

B—from the VEM to Firewall-2;

C—from Firewall-2 to the VEM;

D—from the VEM to Firewall-1;

E—from Firewall-1 to the VEM; and

F—from the VEM to the internet.

Alternatively, as mentioned above, the VEM may be configured to handle traffic/packets in the reverse direction in a different manner. For instance, either Firewall-1 or Firewall-2 may be configured as a uni-directional firewall, applying its service in a single direction, and thus the VEM may bypass the firewall in the opposite direction than that to which service would be applied. For example, assuming Firewall-2 was uni-directional, then steps B and C immediately above (from the VEM to Firewall-2 and from Firewall-2 to the VEM) could be bypassed by the VEM, accordingly. Also, the different reverse path may include a different VSE (or a different action on a same VSE), such as protecting traffic entering a VSD by a first VSE, and monitoring traffic leaving the VSD by a second VSE.

Figure 5C:
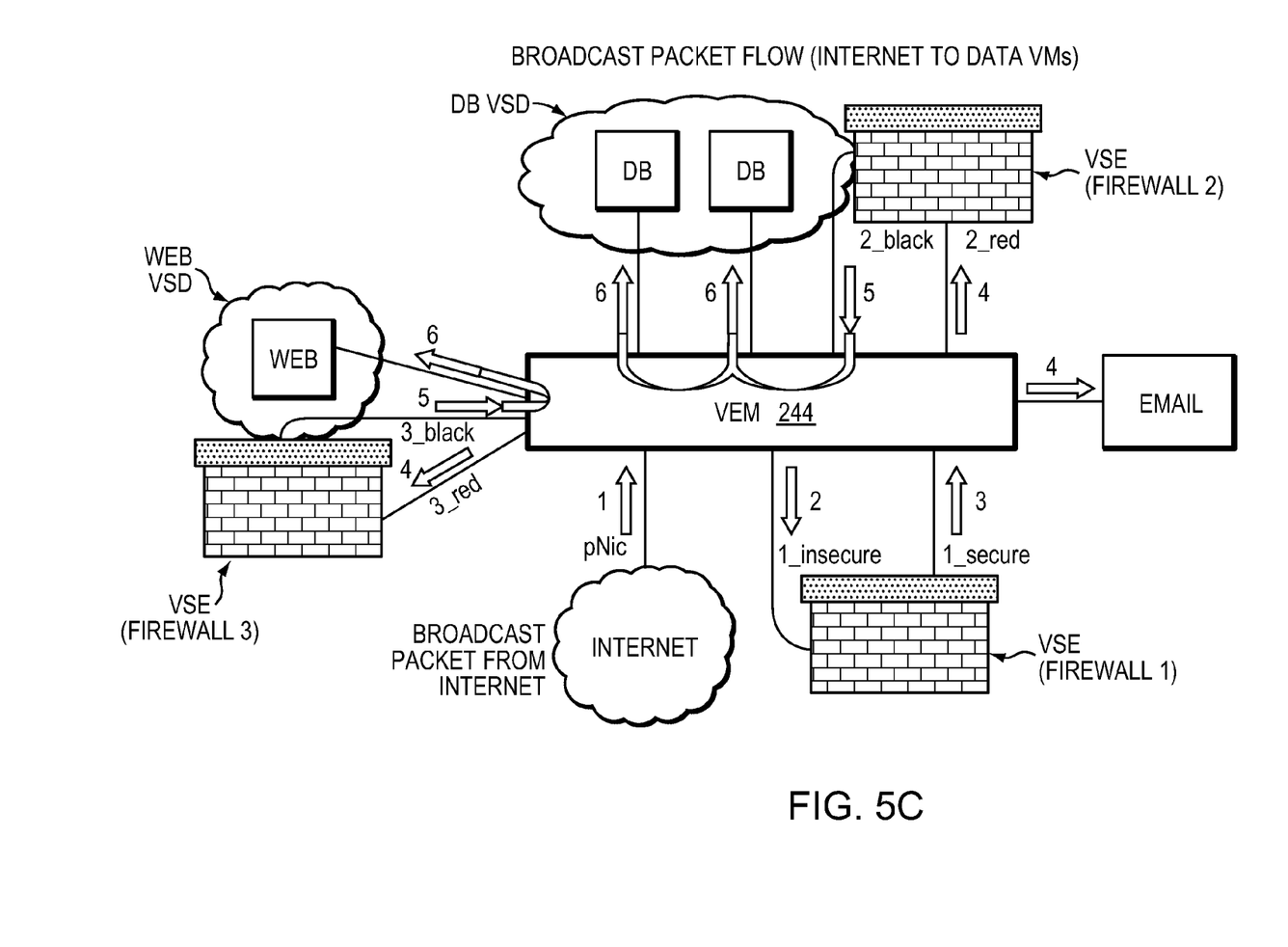

FIG. 5C illustrates an example broadcast packet flow according to one or more embodiments herein, such as from the internet to the internal virtual machines. Note that certain changes to conventional layer-2 lookup processing may be implemented for Broadcast packets, as described below. Note further that unknown unicast packet flows may follow the same logic as the Broadcast flow.

For Broadcast flows, STEPS 1-3 are the same as above for unicast packets, receiving the packets from the internet and sending all packets through Firewall-1, though now with a destination port index as a "broadcast" port index. In STEP 4, since the destination port index is the Broadcast port index, the VEM floods the packets to all unvisited VSE Firewall ingress (e.g., "red") ports and all virtual machines which are not protected by any VSE (e.g., the email virtual machine), thus not transmitting broadcast packets Firewall-1 or to the virtual machines that are serviced/guarded by any VSE (such as the Web server and the DBs). In STEP 5, broadcast packets are received back from the serviced VSE ports (e.g., "black"

ports), and then in STEP 6, any broadcast packet received from the VSEs are flooded to only the virtual machines within that corresponding VSD (arrows for Steps 5 and 6 are shown connected according to VSD assignments).

Figure 5D:
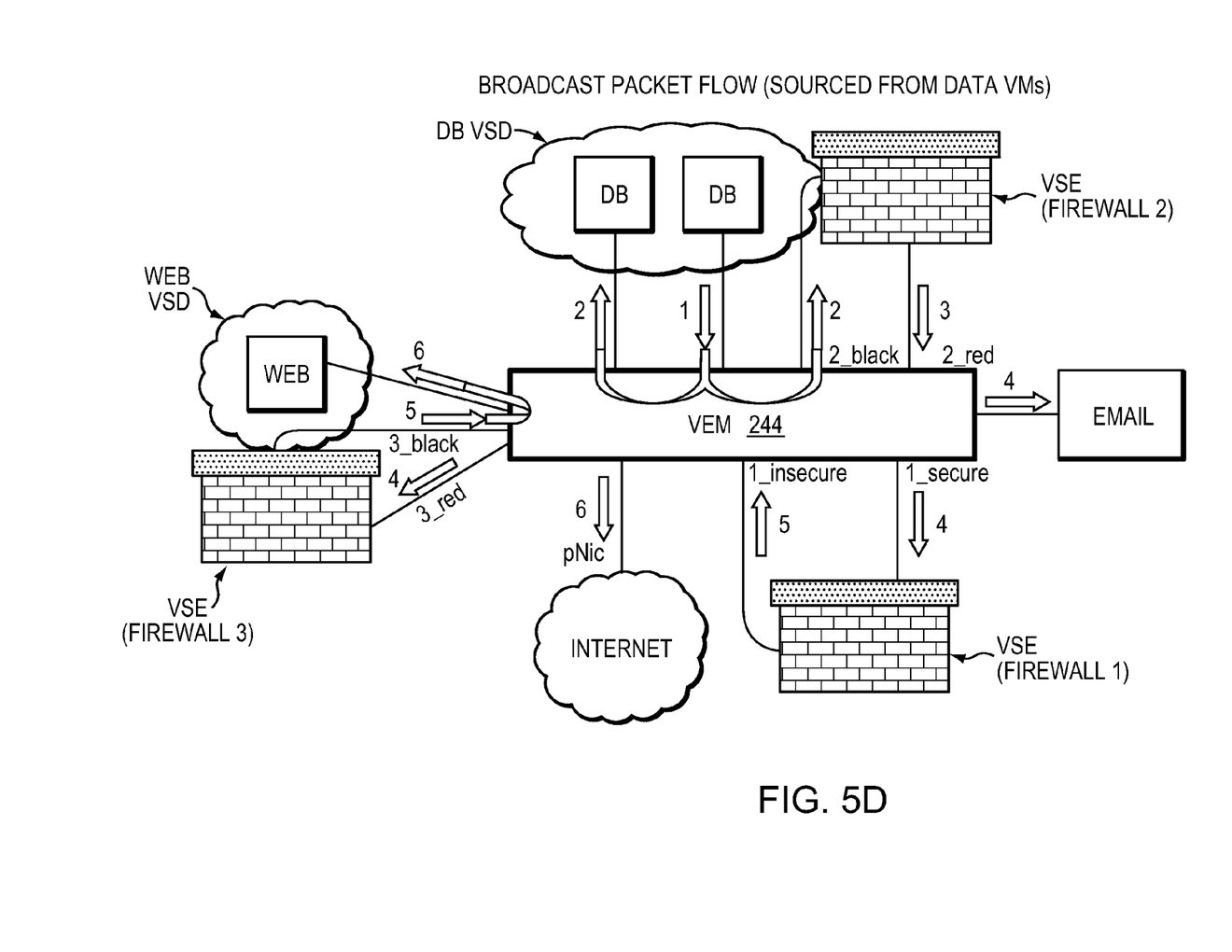

FIG. 5D illustrates the broadcast packet flow in the (reverse) direction from one of the DBs. Assuming that unidirectional VSEs are not configured, the sequence is as follows:

STEP 1: The packet is received through a virtual network interface from the database virtual machine, and source port index is learned from the source MAC address while the destination port index is the broadcast port index. The source port index is used to determine from the port entry table that the packet is received from the associated DB VSD.

STEP 2: The broadcast packets may then be sent to a) all members in the VSD (e.g., the other DB virtual machine) and b) toward the outside of the VSD through the associated VSE egress service port (e.g., its black port) of Firewall-2.

STEP 3: A returned broadcast packet may then be received from the serviced VSE port (e.g., Firewall-2's red port), such that the source port index is now the service port's port index.

STEP 4: The destination port index is still the broadcast port index, so the packets are flooded by the VEM to all VSE ingress ports (to enter other VSDs) and all virtual machines that are not protected by any VSE (e.g., the email server). Note that broadcast packets will not be transmitted to virtual machines that are serviced/guarded by any VSEs.

STEP 5: Broadcast packets are received from serviced VSE ports (e.g., from Firewall-3's serviced/black port for the Web VSD and Firewall-1's insecure port for the Internet VSD); and STEP 6: Any broadcast packets received from a VSE servicing a VSD will then be flooded by the VEM to the corresponding ports within that VSD (e.g., to the Web server and to the internet, respectively).

Figure 5E:
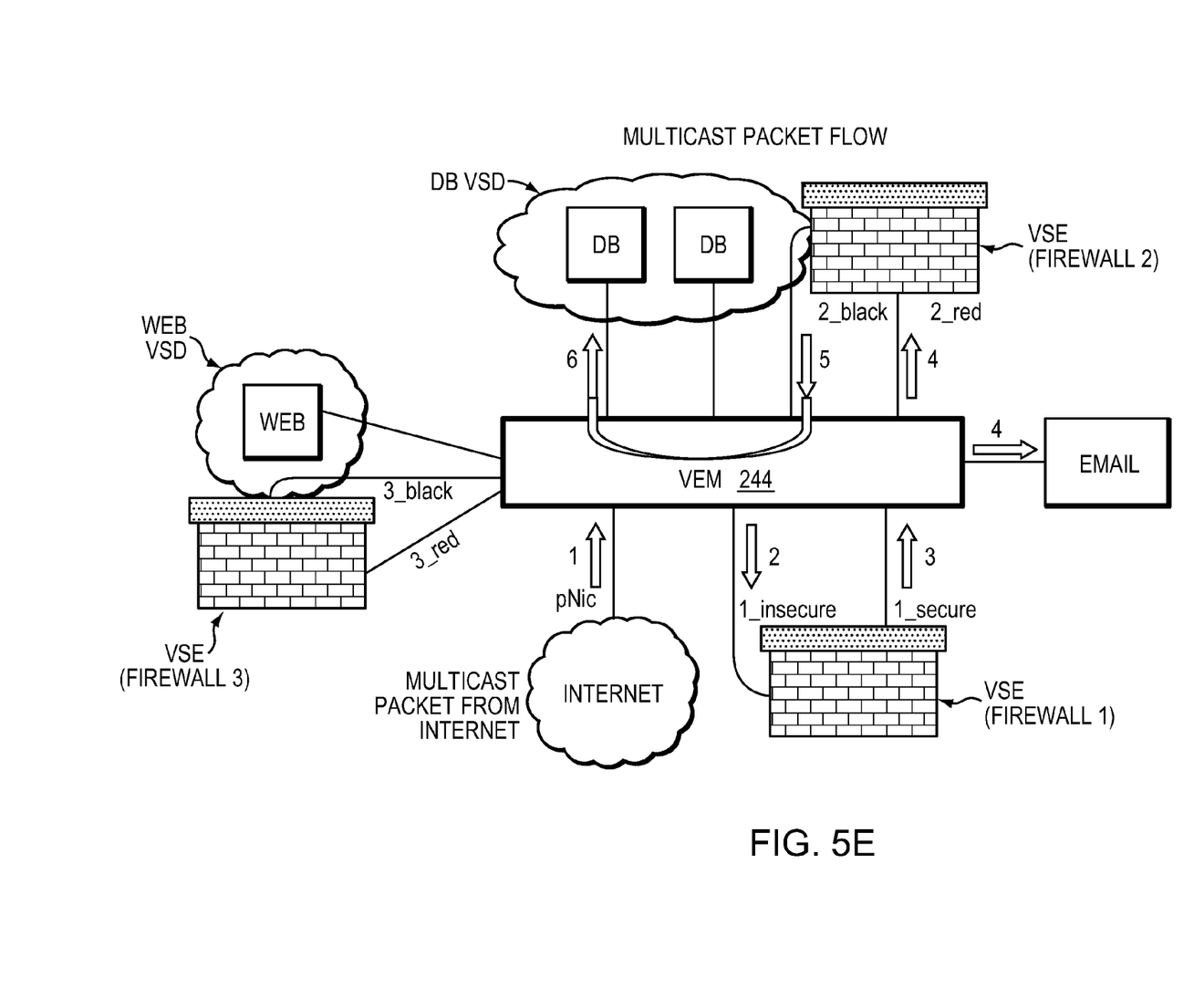

FIG. 5E illustrates an example multicast packet flow according to one or more embodiments herein, such as from the internet to a multicast group to which one DB server and the email server (virtual machines) belong. For multicast flows received from the internet, STEPS 1-3 are the same as above for unicast and broadcast packets, receiving the packets from the internet and sending all packets through Firewall-1, though now with a destination port index as a "multicast" port index. In STEP 4, since the destination port index is the multicast port index, the VEM forwards the packets directly to any virtual machines that are members of the multicast group that are not serviced by a VSE (e.g., the email server), and also to the ingress port of any VSE that services a virtual machine that is a member of the multicast group in order to enter the corresponding VSD. In STEP 5, multicast packets are received back from the serviced VSE port of Firewall-2, and then in STEP 6 those returned/serviced packets may be sent to the DBs within that corresponding VSD that are members of the multicast group (arrows for Steps 5 and 6 are shown connected according to multicast group membership).

Notably, the example flows shown in FIGS. 5B-5E are merely for illustrative purposes. Further, according to one or more embodiments herein, any unicast, broadcast, or multicast traffic forwarded among virtual machines within a same VSD will not be forwarded through any VSE/SVM. That is, if the source port index and destination port index belong to the same VSD, the packet is simply forwarded to the destination. Also, traffic between two non-VSD virtual machines (or, within the "default" VSD) is not subjected to any VSE processing. Generally, only traffic entering or leaving a serviced VSD is redirected by the VEM through the corresponding VSE, accordingly.

Figure 6:
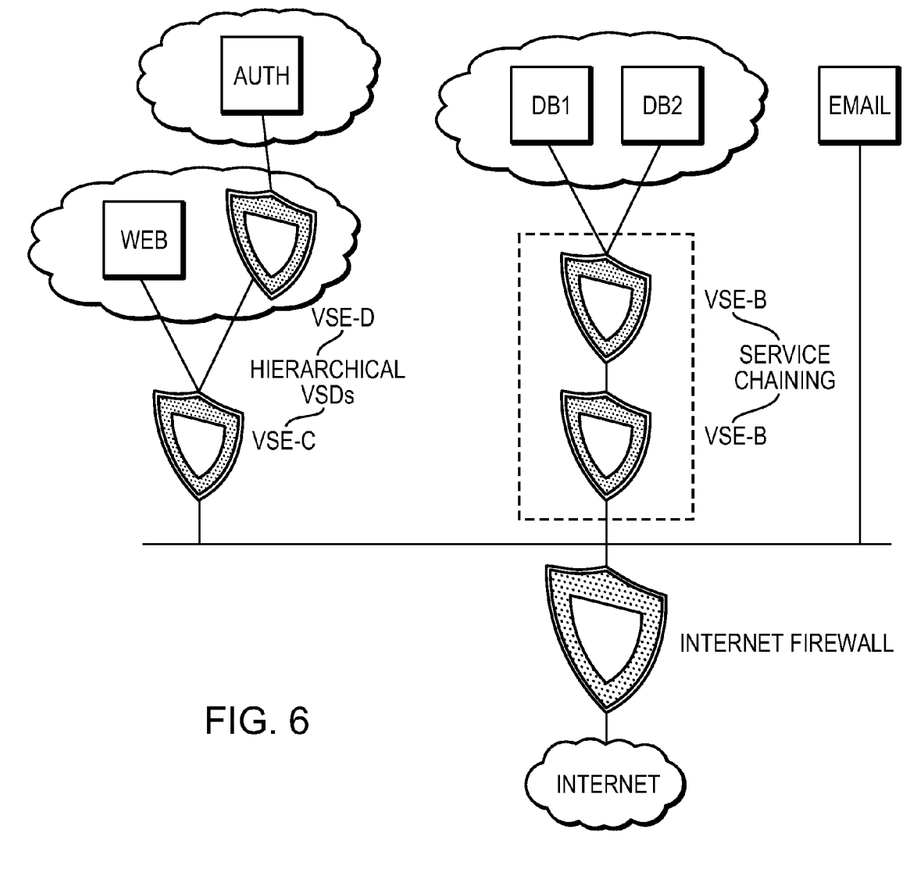
FIG. 6 illustrates an example virtual view of the network device with alternative arrangements.

According to one or more embodiments described herein, the techniques above may be extended to include service chaining (sequential VSEs) and hierarchical VSDs. For instance, FIG. 6 illustrates service chaining and hierarchical VSDs, as seen logically for the VSDs. That is, each of the VSEs and virtual machines shown have their port(s) interconnected directly with the VEM 244, and not with each other as shown. For example, prior to reaching the database servers within DB VSD, VSE-A and VSE-B must first be traversed, and in that order. In other words, to reach the DBs, the VEM transmits packets to VSE-A's ingress port to be serviced, then packets received from VSE-A's egress port are forwarded by the VEM to VSE-B's ingress port. Then, packets from VSE-B's egress port are considered to be within the DB VSD, and may be forward to and between the DBs, accordingly. A hierarchical VSD arrangement is also shown in FIG. 6, where a first Web VSD serviced/protected by VSE-C contains a web server and another VSE-D to reach an authentication server in its own VSD (thus, to reach the authentication server, the chain of VSE-C and VSE-D is traversed). While the service chaining or hierarchical VSDs are shown as only having two levels, additional levels of chaining (additional VSEs and/or VSDs) may be used in accordance with the techniques described herein.

In addition, according to one or more embodiments described herein, the techniques above may be extended to include VLAN (virtual local area network) filtering, where it may be possible to specify particular VLANs to which the services (provided by the VSEs) are to be applied. For instance, it may be desired that a particular service be applied by a VSE to enter a corresponding VSD only for certain traffic (e.g., to external traffic but not internal traffic). The desired result may thus be achieved by configuring different VLANs to distinguish the traffic (e.g., VLANs for external traffic and different VLANs for internal traffic) and by specifying the VLANs for servicing by the VSE ingress ports (e.g., a list of VLANs that are to be serviced). Any VLAN that is not to be serviced by a VSE to enter a corresponding VSD may simply be forwarded directly into the VSD, bypassing the servicing VSE.

The techniques described above address grouping physical and/or virtual layer-2 ports into service domains (VSDs), and associating a sequence of service pair ports to each VSD. Particularly, according to embodiments herein, a VEM 244 may be used to redirect network traffic directed to or coming from such VSDs to the specified service ports (VSEs) in the order specified. The use of VSDs allow for customer and/or provider control of policies and other types of configurations or attributes within a server (e.g., a virtualized server) by managing the redirection of traffic according to the VSD configurations. By using port profiles (manually or dynamically defined), the VEM 244 may determine whether a port is within a particular VSD, and whether the port is a particular type of service port (ingress or egress) at the boundary of a particular VSD. This arrangement of VSDs correspondingly allows for the simple configuration of one or more virtual machines and/or VSEs on a single host, where the addition of new virtual machines and/or VSEs on that host does not require newly defined network policies for each addition, as it would when using virtual switches as noted above.

Figure 7:
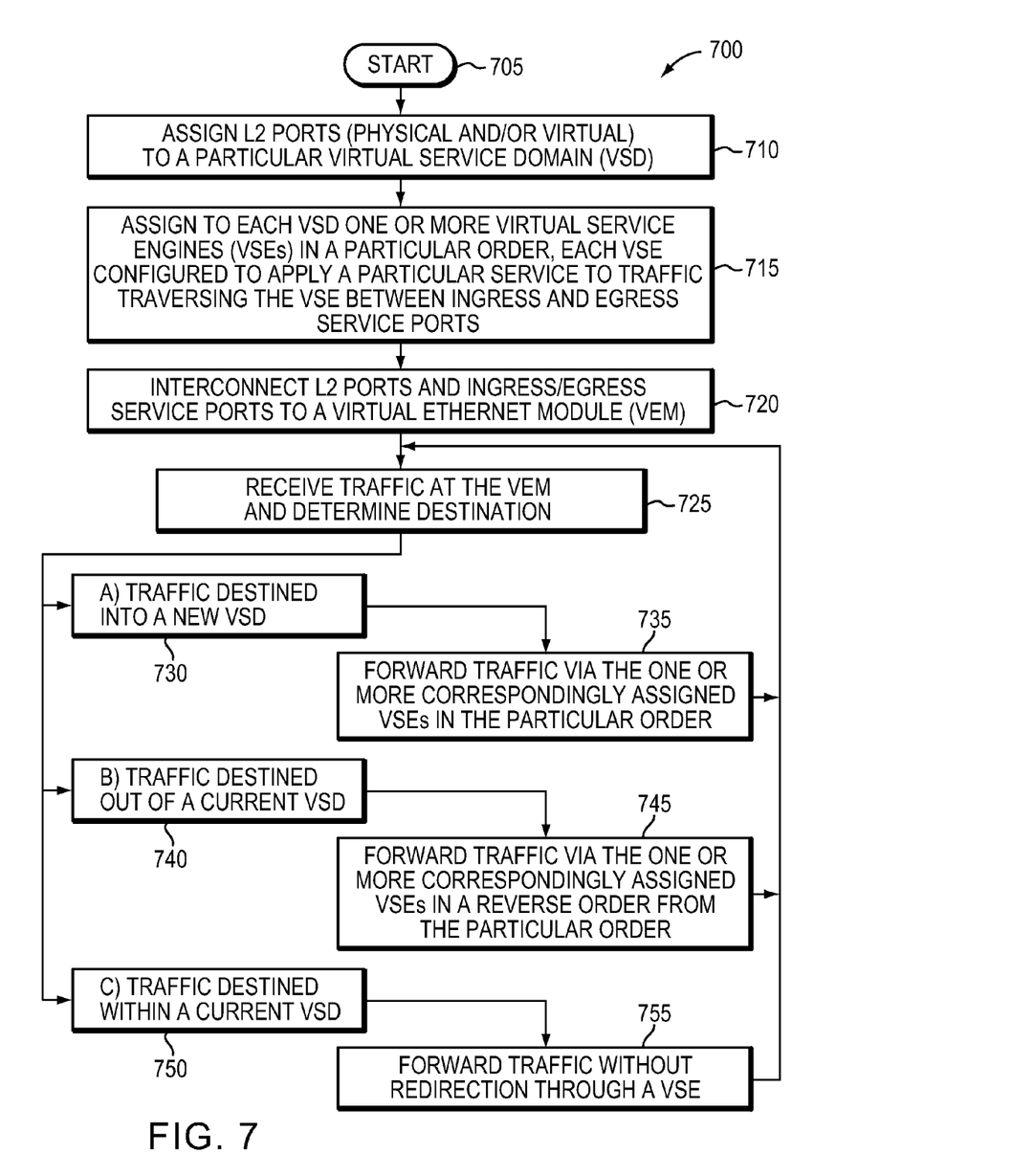
FIG. 7 illustrates an example procedure for managing virtual service domains.

FIG. 7 illustrates a simplified example procedure for managing virtual service domains in accordance with one or more embodiments described herein as described in more detail above. The procedure 700 starts at step 705, and continues to step 710, where physical and/or virtual L2 ports may be assigned to a particular VSD (e.g., the web zone or database zone as mentioned above). As noted, the port assignments may be made manually or by a dynamic process based on port profiles or other factors. Also, in step 715, one or more virtual service engines (VSEs or SVMs) may be assigned, in a particular order, to each VSD, such that each VSE can apply its particular service to traffic traversing the VSE (e.g., traffic protection, monitoring, optimization, etc.).

In step 720 (or, more generally, by nature of the VEM 244), L2 ports and ingress/egress service ports are interconnected to the VEM, such that in step 725 when traffic is received at the VEM from a particular port, the VEM may determine its appropriate destination for forwarding, accordingly. As described in detail above, if traffic is destined to a new VSD (step 730), then the VEM forwards traffic via the one or more correspondingly assigned VSEs in the particular order in step 735. On the other hand, if the traffic is destined out of a current VSD (step 740), e.g., to another VSD or the default VSD, then in step 745 the traffic is forwarded via the one or more correspondingly assigned VSEs in a reverse order from the particular order. (Note that in certain configurations, it may be possible to bypass the VSEs in the reverse order, such as where conditions need only be met when entering a VSD and not leaving, such as traffic monitoring, firewalling, or other specifically configured needs). Lastly, if the traffic is to remain within a current VSD (step 750), then the traffic is forwarded in step 755 without redirection through a VSE, i.e., directly to the destination port within the current VSD.

The procedure 700 continues to receive and forward traffic at the VEM 244 depending on its destination and transitions through VSD boundaries. Notably, however, the procedure may also return to step 710 to add new ports or modify existing ports, such as adding virtual machines and their virtual ports, or to step 715 to modify VSE assignment. (Such modifications may be manual or dynamic, such as status changes, etc.) Further, it may be possible in step 715 to add VSEs to the device, and to correspondingly assign the added VSE to a particular VSD (in a particular order) with one or more other VSEs assigned to the particular VSD.

Advantageously, the novel techniques described herein manage virtual service domains at a network device in a computer network. Particularly suited for a virtualized environment, the novel techniques alleviates the need to create many virtual switches (vSwitches) within a network device, or to use poorly scalable virtual access control lists (VACLs), thus resulting in a system that is less cumbersome to configure and debug, and that requires reduced internal resources such as memory (e.g., for multiple forwarding tables, etc.). In particular, the techniques described above do not require any assumptions regarding networking protocols, IP addresses, etc. Further, the dynamic aspects of one or more embodiments described herein, such as dynamic assignments, alleviate the need for cumbersome and inefficient manual configuration. Also, adding ports or virtual service engines (service virtual machines) to a device is made simpler, as well as modifying their subsequent configuration.

While there have been shown and described illustrative embodiments that manage virtual service domains in a computer network, it is to be understood that various other adaptations and modifications may be made within the spirit and scope of the embodiments herein. For instance, it is expressly contemplated that the components and/or elements described herein can be implemented as software being stored on a tangible computer-readable medium (e.g., disks/CDs/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
   assigning each of one or more layer-2 (L2) ports of a network device to a particular virtual service domain (VSD), each L2 port interconnected with a virtual Ethernet module (VEM) of the device;
   assigning to each VSD one or more virtual service engines (VSEs) in a particular order, each VSE configured to apply a particular service to traffic traversing the VSE between an ingress service port that does not face a corresponding VSD to which the VSE is assigned and an egress service port that does face the corresponding VSD, the ingress and egress service ports interconnected with the VEM; and
   directing traffic received at the VEM according to a set of rules, comprising:
   a) for traffic traversing into a destination VSD, directing the traffic via the one or more correspondingly assigned VSEs in the particular order;
   b) for traffic traversing out of a current VSD, directing the traffic via the one or more correspondingly assigned VSEs in a reverse order from the particular order; and
   c) for traffic remaining within a current VSD, directing the traffic without redirection through a VSE.

2. The method as in claim 1, wherein assigning an L2 port to a VSD comprises:
   receiving a manual port assignment for a particular L2 port.

3. The method as in claim 1, wherein assigning an L2 port to a VSD comprises:
   dynamically assigning a particular L2 port to a particular VSD.

4. The method as in claim 3, wherein dynamically assigning comprises:
   determining a port assignment for a particular L2 port based on port attributes of the particular L2 port.

5. The method as in claim 1, wherein the traffic to be directed is selected from the group consisting of: unicast traffic, multicast traffic, and broadcast traffic.

6. The method as in claim 1, further comprising:
   preventing media access control (MAC) address learning on the ingress service port and egress service port of VSEs on the device.

7. The method as in claim 1, wherein at least one L2 port is a physical port of the device.

8. The method as in claim 1, wherein at least one L2 port is a virtual port of the device.

9. The method as in claim 1, wherein L2 ports of the device that are not assigned to a VSD are considered to be within a default VSD without an assigned VSE.

10. The method as in claim 1, wherein the egress service port of a particular VSE is within the corresponding VSD to which the particular VSE is assigned.

11. The method as in claim 1, wherein the VSDs are non-overlapping.

12. The method as in claim 1, further comprising:
   chaining a plurality of VSDs, wherein to reach a second VSD, a first VSD and its assigned one or more VSEs must first be traversed.

13. The method as in claim 1, further comprising:
   adding a virtual machine to the device, the virtual machine having one or more virtual L2 ports; and
   assigning each of the virtual L2 ports of the virtual machine to a particular VSD.

14. The method as in claim 1, further comprising:
adding a VSE to the device;
assigning the added VSE to a particular VSD in a particular order with one or more other VSEs assigned to the particular VSD.

15. An apparatus, comprising:
a processor adapted to execute one or more processes;
one or more layer-2 (L2) ports;
one or more virtual service engines (VSEs), each VSE configured to apply a particular service to traffic traversing the VSE between an ingress service port that does not face a corresponding virtual service domain (VSD) to which the VSE is assigned and an egress service port that does face the corresponding VSD;
a memory configured to store VSD assignments, wherein one or more of the L2 ports are assigned to a particular VSD and wherein each VSD is assigned one or more VSEs in a particular order; and
a virtual Ethernet module (VEM) interconnected with the L2 ports, the ingress service ports of the one or more VSEs, and the egress service ports of the one or more VSEs, the VEM configured to direct traffic received at the VEM according to a set of rules, comprising:
  a) for traffic traversing into a destination VSD, directing the traffic via the one or more correspondingly assigned VSEs in the particular order;
  b) for traffic traversing out of a current VSD, directing the traffic via the one or more correspondingly assigned VSEs in a reverse order from the particular order; and
  c) for traffic remaining within a current VSD, directing the traffic without redirection through a VSE.

16. The apparatus as in claim 15, further comprising:
a user interface to receive a manual port assignment that assigns an L2 port to a VSD.

17. The apparatus as in claim 15, wherein the VEM is further configured to dynamically assign a particular L2 port to a particular VSD.

18. The apparatus as in claim 15, wherein the one or more L2 ports are selected from a group consisting of: physical ports and virtual ports of the device.

19. The apparatus as in claim 15, further comprising:
one or more virtual machines.

20. The apparatus as in claim 19, wherein the virtual machines are selected from the group consisting of: a web server, an email server, a database server, and a storage server.

21. A non-transitory computer-readable media having software encoded thereon, the software when executed on a device having one or more layer-2 (L2) ports operable to: determine, for at least one of the one or more layer-2 (L2) ports, to which particular virtual service domain (VSD) the at least one L2 port is assigned; determine one or more virtual service engines (VSEs) that are assigned to each VSD, the VSEs being assigned in a particular order, each VSE configured to apply a particular service to traffic traversing the VSE between an ingress service port that does not face a corresponding VSD to which the VSE is assigned and an egress service port that does face the corresponding VSD; and direct traffic within the device according to a set of rules, comprising: a) for traffic traversing into a destination VSD, directing the traffic via the one or more correspondingly assigned VSEs in the particular order; b) for traffic traversing out of a current VSD, directing the traffic via the one or more correspondingly assigned VSEs in a reverse order from the particular order; and c) for traffic remaining within a current VSD, directing the traffic without redirection through a VSE.

\* \* \* \* \*

UNITED STATES PATENT AND TRADEMARK OFFICE
CERTIFICATE OF CORRECTION

PATENT NO. : 8,274,973 B2  Page 1 of 1
APPLICATION NO. : 12/730352
DATED : September 25, 2012
INVENTOR(S) : Srinivas Sardar et al.

It is certified that error appears in the above-identified patent and that said Letters Patent is hereby corrected as shown below:

In the Specifications

Col. 1, line 34: "triple forwarding tables for each ~~vS witch~~ vSwitch, etc.)."

Col. 7, line 20-21: "to virtual machines or VSEs, the values may ~~is~~ adjust dynamically."

Col. 7, line 57: "VSD Table (in this case Firewall-1's ~~is~~ input port is a port"

Signed and Sealed this
Twenty-third Day of July, 2013

Teresa Stanek Rea
*Acting Director of the United States Patent and Trademark Office*